United States Patent
Gandhi et al.

(10) Patent No.: US 12,494,196 B2
(45) Date of Patent: Dec. 9, 2025

(54) AUTOCOMPLETE SUGGESTIONS FOR SPEAKERS IN ONLINE MEETINGS

(71) Applicant: Cisco Technology, Inc., San Jose, CA (US)

(72) Inventors: Indermeet Singh Gandhi, San Jose, CA (US); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 259 days.

(21) Appl. No.: 18/325,600

(22) Filed: May 30, 2023

(65) Prior Publication Data

US 2024/0404517 A1    Dec. 5, 2024

(51) Int. Cl.
*G10L 15/22*    (2006.01)
*G10L 15/04*    (2013.01)
*G10L 15/197*    (2013.01)

(52) U.S. Cl.
CPC ............ *G10L 15/197* (2013.01); *G10L 15/04* (2013.01); *G10L 15/22* (2013.01)

(58) Field of Classification Search
CPC ....... G10L 15/22; G10L 15/04; G10L 15/197; G10L 15/32; G10L 13/02; G10L 15/002; G10L 15/16; G10L 15/063; G10L 17/00; G10L 17/02; G10L 17/22; G10L 2015/221; G10L 25/78; G06F 40/35; G06F 40/284; G06F 40/289; G06F 40/30; G06F 40/44; G06F 40/58; G06N 20/00
USPC ....................................................... 704/240
See application file for complete search history.

(56) References Cited

U.S. PATENT DOCUMENTS

| | | | |
|---|---|---|---|
| 11,095,468 B1* | 8/2021 | Pandey | H04L 12/1831 |
| 12,087,276 B1* | 9/2024 | Nokob | G10L 15/02 |
| 2014/0108544 A1* | 4/2014 | Lewis | H04L 12/1818 |
| | | | 709/204 |
| 2015/0012270 A1* | 1/2015 | Reynolds | G10L 25/87 |
| | | | 704/233 |
| 2015/0120302 A1* | 4/2015 | Mccandless | G06Q 30/02 |
| | | | 704/257 |
| 2016/0117624 A1* | 4/2016 | Flores | H04L 67/306 |
| | | | 705/7.39 |
| 2017/0060230 A1* | 3/2017 | Faaborg | G06F 3/017 |
| 2017/0091168 A1 | 3/2017 | Bellegarda et al. | |
| 2017/0177928 A1* | 6/2017 | Cunico | H04L 65/403 |

(Continued)

OTHER PUBLICATIONS

Google, "How Google autocomplete predictions work," Google Search Help, retrieved from https://support.google.com/websearch/answer/7368877?hl=en#zippy=%2Cwhere-autocomplete-predictions-come-from%2Chow-we-handle-issues-wit%E2%80%A6, on May 26, 2023, 3 pages.

Taylor, R., et al., "Galactica: A Large Language Model for Science," https://arxiv.org/abs/2211.09085, Nov. 16, 2022, 58 pages.

Baese-Berk, M., et al., "Speaking rate consistency in native and non-native speakers of English," https://doi.org/10.1121/1.4929622, Sep. 4, 2015, 16 pages.

(Continued)

*Primary Examiner* — Vijay B Chawan
(74) *Attorney, Agent, or Firm* — Edell, Shapiro & Finnan, LLC

(57) ABSTRACT

Audio is captured from an online meeting and words being spoken by a participant during the online meeting from the audio are identified. One or more suggested next words or phrases to be spoken by the participant are determined based on the words being spoken by the participant and one or more scores associated with previous words spoken by the participant. The words being spoken by the participant and the one or more suggested next words or phrases are generated for display to the participant.

20 Claims, 6 Drawing Sheets

(56) References Cited

U.S. PATENT DOCUMENTS

| | | | |
|---|---|---|---|
| 2018/0046957 A1 | 2/2018 | Yaari et al. | |
| 2018/0077099 A1* | 3/2018 | Silva | H04L 51/04 |
| 2018/0101824 A1* | 4/2018 | Nelson | G06Q 10/1095 |
| 2018/0321803 A1 | 11/2018 | Wu et al. | |
| 2019/0327103 A1* | 10/2019 | Niekrasz | G10L 15/26 |
| 2020/0286476 A1* | 9/2020 | Abdulkader | G10L 15/01 |
| 2021/0111915 A1 | 4/2021 | Harpur et al. | |
| 2021/0327416 A1 | 10/2021 | Clark et al. | |
| 2022/0182253 A1* | 6/2022 | Pawar | H04L 12/1818 |
| 2023/0269287 A1* | 8/2023 | Vashisht | H04L 65/1083 |
| | | | 348/14.03 |
| 2023/0291595 A1* | 9/2023 | Daredia | G06F 16/44 |
| 2023/0353680 A1* | 11/2023 | Chu | G10L 17/02 |
| 2024/0404517 A1* | 12/2024 | Gandhi | G10L 15/22 |
| 2024/0412720 A1* | 12/2024 | Vasylyev | G06F 16/90332 |
| 2025/0028579 A1* | 1/2025 | Mehmeri | G06N 3/006 |

OTHER PUBLICATIONS

Sanford, C., "Introduction to Speech Recognition Algorithms: Learn How It Has Evolved," https://www.rev.com/blog/speech-to-text-technology/introduction-to-speech-recognition-algorithms, Jul. 26, 2021, 14 pages.

Omilia Real-Time ASR | Deepgram, "Is DeepASR lacking in capabilities that you don't want to develop?," retrieved from https://deepgram.com/omilia/, on May 26, 2023, 11 pages.

Heaven, W., "Google's auto-complete for speech can cover up glitches in video calls," MIT Technology Review, https://www.technologyreview.com/2020/04/06/998,410/google-artificial-intelligence-autocomplete-internet-voice-speech-glitches-video-call/, Apr. 6, 2020, 6 pages.

* cited by examiner

| WORD | SCORE |
|---|---|
| ecosystem | A |
| environment | B |
| world | C |
| community | D |

FIG.3

AUTOCOMPLETE SUGGESTIONS FOR SPEAKERS IN ONLINE MEETINGS

TECHNICAL FIELD

The present disclosure relates to online video meetings/conferences.

BACKGROUND

Presenting material in a public setting may be difficult for some speakers, particularly if the speaker is communicating in a non-native language. Many times, speakers search for the correct descriptive words, which may cause the speaker to pause for a length of time. In addition, a speaker may use basic words instead of descriptive or expressive words when presenting the material. A collaboration tool should be able to provide an equitable playing field for every participant in an online meeting, regardless of the participant's background.

BRIEF DESCRIPTION OF THE DRAWINGS

FIG. 3 shows an example user profile for storing word suggestions and scores, according to an example embodiment.

DETAILED DESCRIPTION

Overview

In one embodiment, a method is provided for generating and displaying next word suggestions to a speaker during an online meeting. The method includes capturing audio from an online meeting; identifying words being spoken by a participant during the online meeting from the audio; determining one or more suggested next words to be spoken by the participant based on the words being spoken by the participant and one or more scores associated with previous words spoken by the participant; and generating for display to the participant the words being spoken by the participant and the one or more suggested next words.

Example Embodiments

Online meetings, discussions, and brainstorming sessions may be used to present or discuss material. Presenting or discussing material may give speakers anxiety, particularly if the speaker is communicating in a non-native language. Speakers may pause frequently to search for a correct word or use basic words instead of descriptive or expressive words. Due to technological advancements, many search engines can suggest terms to users for autocompleting written phrases or sentences. Currently, collaboration tools provide translation or closed captioning services, which may be beneficial to the audience, but not as beneficial to the speaker.

Presented herein are techniques for providing real-time autocomplete and possible next words options to a speaker participating in an online communication session using a collaboration tool. In accordance with embodiments provided herein, a speaker may choose an option to receive auto-complete suggestions while the speaker is presenting or discussing material during an online meeting. When the speaker is speaking, a user interface associated with the speaker may display the words spoken by the speaker and one or more predicted or suggested words to complete a phrase or sentence. The one or more predicted or suggested words may be displayed in different colors based on a score that indicates the likelihood of the speaker choosing the predicted or suggested word. The score may be based on a number of factors, such as previous words chosen or spoken by the speaker, information aggregated from materials associated with the meeting, words commonly spoken by speakers associated with the same company or enterprise associated with the speaker, and additional factors.

Figure 1:
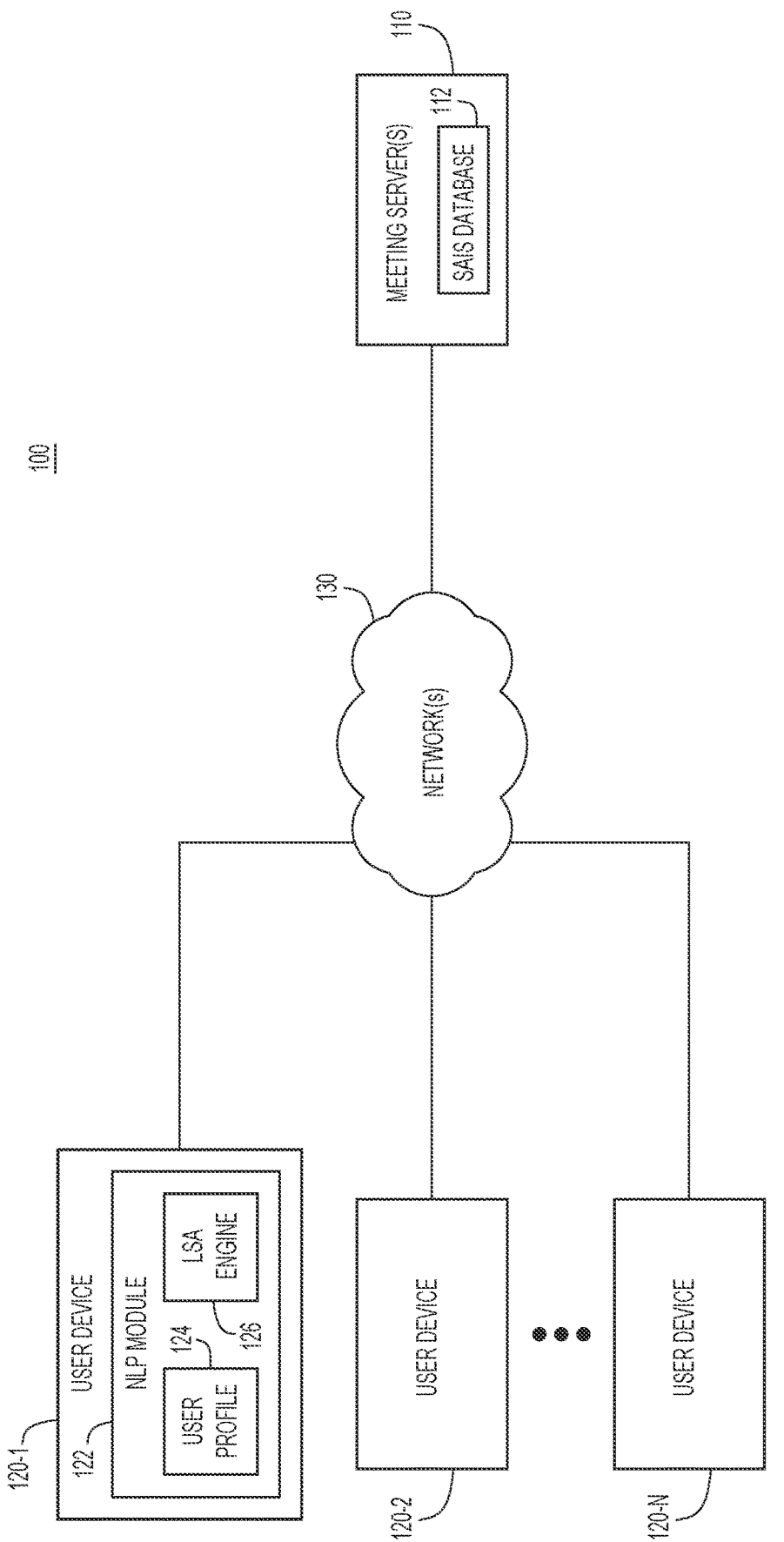
FIG. 1 is a block diagram of an online video conference/meeting system configured to support providing autocomplete suggestions for speakers, according to an example embodiment.

Reference is first made to FIG. 1. FIG. 1 shows a block diagram of a system 100 that is configured to provide online meeting services with auto-completion word suggestions. The system 100 includes one or more meeting server(s) 110 and a plurality of endpoint devices 120-1, 120-2, ..., 120-N (sometimes referred to herein individually as endpoint device 120 or collectively as endpoint devices 120) that communicate with meeting server(s) 110 via one or more networks 130. The meeting server(s) 110 are configured to provide an online meeting service for hosting a communication session among endpoint devices 120-1 to 120-N.

Each of endpoint devices 120-1 to 120-N may be a tablet, laptop computer, desktop computer, Smartphone, virtual desktop client, virtual whiteboard, or any user device now known or hereinafter developed. Endpoint devices 120-1 to 120-N may have a dedicated physical keyboard or touch-screen capabilities to provide a virtual on-screen keyboard to enter text. Endpoint devices 120-1 to 120-N may also have short-range wireless system connectivity (such as Bluetooth™ wireless system capability, ultrasound communication capability, etc.) to enable local wireless connectivity with a video endpoint device in a meeting room or with other user devices in the same meeting room. Endpoint devices 120-1 to 120-N may store content (e.g., a presentation, a document, images, etc.) for sharing the content with other user devices during an online meeting or communication session. In some embodiments, endpoint devices 120-1 to 120-N may be endpoint devices for facilitating communication with meeting server(s) 110 during the online meeting. Endpoint devices 120-1 to 120-N may additionally connect to user devices (not illustrated in FIG. 1) for sharing content stored on the user devices during the online meeting.

In some cases, endpoint devices 120-1 to 120-N may be videoconference endpoints designed for personal use (e.g., a desk device used by a single user) or for use by multiple users (e.g., a videoconference endpoint in a meeting room). In some embodiments, endpoint devices 120-1 to 120-N may be configured to open content to display or share (e.g., when a digital whiteboard is accessed directly on endpoint device 120).

In the example illustrated in FIG. 1, a user of endpoint device 120-1 may be a speaker who is presenting or discussing content during an online meeting. Endpoint device 120-1 includes a natural language processing (NLP) module 122. NLP module 122 may be an add-on module included in a meeting client running on endpoint device 120-1. Although NLP module 122 is shown on endpoint device 120-1, NLP module 122 may be included on any endpoint device 120. NLP module 122 includes user profile 124. As discussed further below, user profile 124 may store information about a user, words/phrases previously spoken by the user, scores associated with the words/phrases, and additional information. NLP module 122 additionally includes latent semantic analysis (LSA) engine 126. As discussed further below, LSA engine compares words suggested to the speaker and words chosen by the speaker and performs an action based on the comparison.

In the example illustrated in FIG. 1, meeting server(s) 110 includes a Suggest as I Speak (SaIS) database 112. As discussed further below, SaIS database 112 may store information regarding the statistical learning for online meetings and identifies words that are associated with customers or enterprises. For example, SaIS database 112 may store words or phrases commonly used during online meetings associated with different customers or enterprises. The information stored in SaIS database 112 may be used when determining auto-completion word suggestions for a particular speaker. For example, as discussed below, word suggestions may be made based on identifying from SaIS database 112 particular words/phrases commonly used in meetings associated with a particular organization or company.

Figure 2:
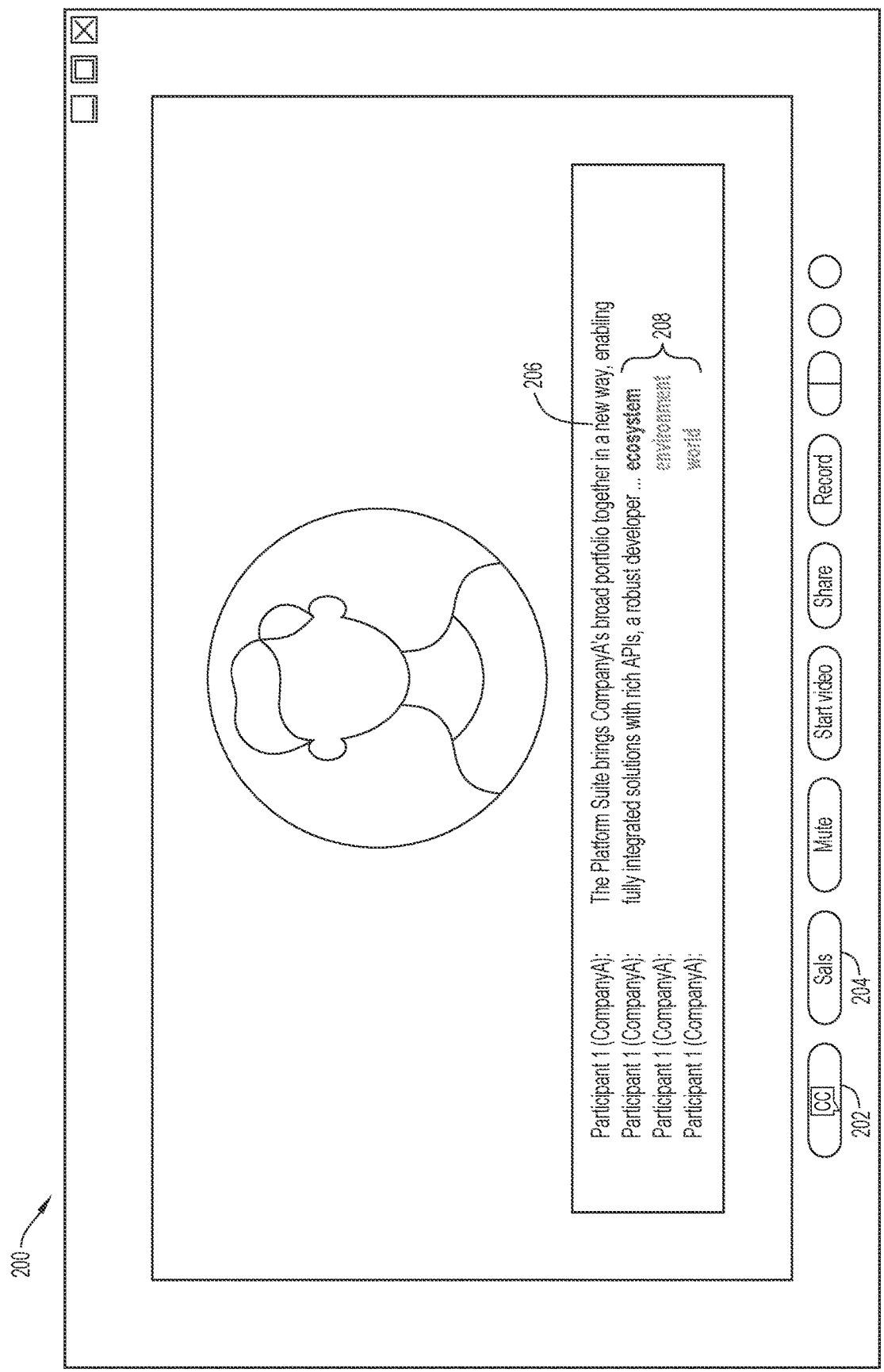
FIG. 2 shows a user interface depicting an example in which autocomplete suggestions are provided to a speaker during an online meeting, according to an example embodiment.

Reference is now made to FIG. 2 with continued reference to FIG. 1. FIG. 2 illustrates an example user interface 200 associated with a speaker during an online meeting. In the example illustrated in FIG. 2, the speaker, Participant 1, is associated with CompanyA.

According to embodiments described herein, the speaker may select an option 202 to activate closed captioning (CC) during the online meeting. The speaker may additionally select an option 204 to activate an SaIS function. When the speaker begins speaking, a microphone associated with endpoint device 120-1 captures an audio input and the SaIS function is activated. At that time, the CC function stops displaying other participants' text and switches to SaIS. In one embodiment, the text may switch color or another indication may be provided that the SaIS function has been activated.

As the speaker starts a sentence, NLP module 122 divides the pronounced sounds/words into tokens and analyzes the tokens to determine what the next tokens should be. In some embodiments, NLP module 122 performs a probabilistic computation on what the next tokens should be. The NLP module 122 may use machine learning to identify the next tokens to suggest. The suggestions may be based, at least in part, on feedback from users. The SaIS displays the pronounced words and suggestions for follow-up words on the screen of the speaker. The SaIS uses a prediction database, augmented over time, to perform the probability computation.

As each voice sample from the speaker is captured (e.g., in 10 to 20 millisecond samples), the voice samples are injected into an automatic speech recognition (ASR) engine, where the NLP module 122 runs. The NLP module 122 establishes sentence segments (i.e., determines where sections of the sentence stop) and determines what are the most likely next words for the segment(s) that ended. To establish the sentence segments, the NLP module 122 may leverage a long short-term memory (LSTM) engine that attempts to tie the current sound sample with one or more previous sound samples to determine if the current sample is more likely a continuation of the previous sample (e.g., in a single word) or is more likely the beginning of the next word or of the next segment.

NLP module 122 additionally includes a classifier that determines whether audio captured is a human voice or noise. Regardless of how fast a speaker talks, humans tend to pause between portions of the meaning they want to convey. For example, a speaker normally will not pause in the middle of a word, may or may not pause at comma points, but will likely pause at the period between the sentences. A speaker who is not reading a statement would likely pause at the comma points, but the NLP module 122 includes tools to address the non-pausing cases. The classifier determines that noise (or silence) that lasts for a certain amount of time (e.g., a human has not pronounced something for n ms) is indicative of a pause and is a probabilistic clue that the previous segment is complete (i.e., a series of words that can be examined for voice-to-text processing). The NLP module 122 may then inject the sentence segment into a second layer engine that attempts to recognize what was said by the speaker.

The time between the end of the word of the segment (i.e., before the silence) and the output of the matching CC text is less than 200-300 ms. If a speaker is nervous or speaking in a non-native language, the speaker's speech may include longer pauses and a greater number of hesitations, even within segments. At the end of the segment detection (e.g., when a pause occurs), NLP module 122 may produce the text of the segment (i.e., the sentence up to the pause) within about 200 ms. As the text of the segment is being produced the NLP module 122 compares the sounds to the most likely sequence of words in a model being run by the NLP module 122. A sentence model may be of a CC type, but it may also include a predictive component that surfaces based on the previous segment to determine the most likely (or possible) next segments. In some embodiments, suggested next segments may be determined within 30 ms. Therefore, the segments that were spoken may be determined and the next segments to continue a sentence may be suggested within about 230 ms.

In some embodiments, next words or phrases may be suggested based on the segment detection. In other embodiments, next words or phrases may be suggested when the user appears to be struggling to determine the next word or phrase. For example, the next word or phrases may be suggested when the user pauses for a threshold amount of time or longer. In another example, the next word or phrase may be suggested if hesitation words (e.g., um, uh, etc.) are spoken by the user.

In some embodiments, the sentence may change as the speaker completes the sentence. NLP module 122 produces a probability value for each sequence of words associated with a segment that has spoken, but that probability has no value of absolute truth. For example, NLP module 122 may conclude that segment " . . . a . . . " has a probability score of 96.4%, segment " . . . b . . . " has a probability score of 2.65%, segment " . . . c . . . " has a probability score of 0.75%, etc. When there are pauses within segments, or when the segment is too long (e.g., when the user is not pausing long enough for the engine to detect the segment boundary), the NLP module 122 may output the segment text with the highest probability, even if the probability is not very high (e.g., highest probable segment value is "... a ..." (52.4%), although " ... b ... " (32.1%) was also raised as a possibility, but with lower probability). Then, as the next segment concludes, the NLP module 122 may also attempt to map the previous segment to the next segment. NLP module 122 may conclude that if the next segment is " ... d ... " with a high enough probability, the previous segment could not possibly be " ... a ... " because the likelihood of the sequence " ... a ... d ... " is much lower than the probability of " ... b ... d ... ". Therefore, the NLP module 122 may correct the prediction for the previous segment and the segments displayed may change dynamically.

As illustrated at 206 in FIG. 2, as the speaker is talking, the SaIS function presents the words spoken by the speaker on the display. The SaIS function additionally displays one or more suggested words to complete the speaker's phrase or sentence. As illustrated in FIG. 2, Participant 1 has said "The Platform Suite brings CompanyA's broad portfolio together in a new way, enabling fully integrated solutions with rich APIs, a robust developer" and the SaIS function has provided three suggested words/phrases 208 for completing Participant 1's sentence or phrase. In this example, the SaIS function has provided the options "ecosystem," "environment," and "world."

As discussed above, each word suggestion is associated with a probability score that indicates a likelihood that the word is the word to be spoken next by the speaker. In one embodiment, words/phrases with a probability score above a configurable threshold may be displayed. In another embodiment, the suggested word with the highest probability score is presented first on the list of word suggestions. In yet another embodiment, the words are displayed with a different color coding structure based on the probability scores associated with the suggested words. For example, as shown in FIG. 2, the word "ecosystem" is shown in a first color (indicating that the probability score associated with the word is in a first range) and the words "environment" and "world" are shown in a second color (indicating that the probability scores associated with the words are in a second range).

As long as the probability scores are above the configurable threshold, the SaIS may display a large set of predicted tokens. When a longer sequence of possible continuation word/phrases for the started sentence is displayed, the user is allowed more time to decide on the right wording. In addition, displaying the suggested words using the color coding structure allows the user, over time, to gain confidence (e.g., from implicit habit in seeing the same colors) that there is either a single possible continuation word/phrase for the started sentence or that there are different possibilities with different likelihoods. The confidence may help the user make better word choices that sound more natural.

The suggested words/phrases and the probability scores for the suggested words/phrases are based on a probabilistic computation on what the next tokens should be based on the words spoken by the user. The probabilistic computation is based on many different factors. One factor may include previous words chosen or spoken by the user and scores associated with the previous words chosen or spoken by the user.

Reference is now made to FIG. 3 with continued reference to FIGS. 1 and 2. FIG. 3 is an example portion of user profile 124. As discussed above, user profile 124 stores information about a user, including words previously chosen/spoken by the user and a score associated with each word.

As illustrated in FIG. 3, user profile 124 stores the words "ecosystem," "environment," and "world" and a corresponding score. For example, entry 302 shows that the score associated with the word "ecosystem" is A, entry 304 shows that the score associated with the word "environment" is B, and entry 306 shows that the score associated with the word "world" is C. When performing the probabilistic computation for the suggested words to display to Participant 1 for the example illustrated in FIG. 2, NLP module 122 may identify the scores associated with words in user profile 124 when determining the words/phrases to suggest and the probability scores associated with the words/phrases. In this example, score A may be higher than scores B and C. Therefore, the probability score for the word "ecosystem" may be higher than the probability scores calculated for the words "environment" and "world."

Another factor that may be considered when determining the suggested words/phrases and the probability scores associated with the words/phrases is input from sources associated with the online meeting. For example, if the information is available before the user starts speaking a sentence, NLP module 122 may identify information from the meeting invite, an agenda for the meeting, the meeting title, material being shared on the screen (e.g., optical character recognition (OCR) of displayed text, auto-description of visuals, etc.), or other information associated with the meeting when and use the information when determining the suggested words/phrases and the probability scores. For example, if one of the possible words to suggest is also in an agenda associated with the meeting, the word may be suggested and the probability score associated with the word may be higher than probability scores for other suggested words.

Another factor that may be considered when determining the suggested words/phrases and the probability scores associated with the words/phrases is a word/phrase preferences associated with a particular customer, enterprise, or organization. SaIS database 112 at meeting server(s) 110 may store information associated with words commonly chosen by participants associated with particular customers or enterprises. For example, the SaIS database 112 may be enhanced using the anonymized statistical learning of calls associated with particular customers/enterprises/organizations. For the example discussed with respect to FIG. 2, words commonly chosen by participants associated with CompanyA may be selected as suggested words. In one embodiment, these words may be displayed first on the list of suggested words (e.g., to promote company culture). In another embodiment, the word being a common word spoken by participants associated with CompanyA may be a factor when calculating the probability score associated with a word. In this embodiment, the suggested word associated with CompanyA may have the highest probability score and, therefore, may be displayed first on the list of suggested words.

In addition, well-known idioms, phrases, and expressions may be used by the NLP module 122 to determine the next words/phrases to suggest. For example, if a speaker says, "we have to make sure to dot ... ," the NLP module 122 may suggest the continuation "your Is and cross your Ts." The NLP module 122 may additionally be trained to be context specific (e.g., to the user, the enterprise, the field of the enterprise, etc.). In addition, the NLP module 122 may be trained by a user by marking words/phrases that are favorites or newly learned by the user. These words/phrases may be used by the NLP module 122 to make a prediction of continuation words/phrases. For example, the NLP module 122 or user profile 124 may store corporate words/phrases (e.g., flywheel, wheelhouse, low-hanging fruit), phrases, idioms, quotes, etc. that the user has selected. In this way the prediction pattern may become customized for a particular user.

When a speaker chooses the next word, either by selecting one of the suggested words/phrases 208 or by selecting a different word/phrase, the LSA engine 126 activates. The LSA engine 126 compares the proposed words to the sequence chosen by the speaker. In one embodiment, the LSA engine 126 records the speaker's choice and uses the speaker's choice to update scores associated with words in the user profile 124. If a particular word is chosen, the word gets an increased probability of being selected subsequently. In addition, the probability score of the word may be increased in the future. For example, in the example discussed in FIG. 2, if the user chooses the word "environment," the score for the word "environment" may be increased in the user profile 124. When the words "ecosystem" and "environment" are subsequently suggested, the word "environment" may have a higher probability score than the word "ecosystem" based on the updated score associated with the word "environment." The new set of scores is stored in the user profile 124, thus providing a refined suggestion selection over time. For example, a shorter set of proposed next words/phrases that better matches the speaker's word preference may subsequently be provided.

When the speaker chooses a word/phrase that was not presented as a suggested word/phrase, the word/phrase is recorded in user profile 124 and associated with a score. For example, if the speaker chooses the word "community" instead of one of the suggested words/phrases 208, the word "community" may be included user profile 124, as shown in entry 308 of FIG. 3. As illustrated in FIG. 3, the word "community" has been assigned a score of D, which has been saved in the user profile 124. The word "community" may subsequently be provided to the speaker as a suggested word.

The LSA engine 126 may additionally incorporate input from the additional sources (e.g., the meeting invite, meeting agenda, meeting title, material being shared on the screen, etc.). The learning may be stored in user profile 124. In another embodiment, the LSA engine 126 may also propagate the selected word choices to the SaIS database 112 to enhance the database with information about the word choices made by participants of a particular company/enterprise/organization. In this way, participants associated with a particular company/enterprise/organization may be provided customer-specific words/phrases as suggestions.

Figure 4:
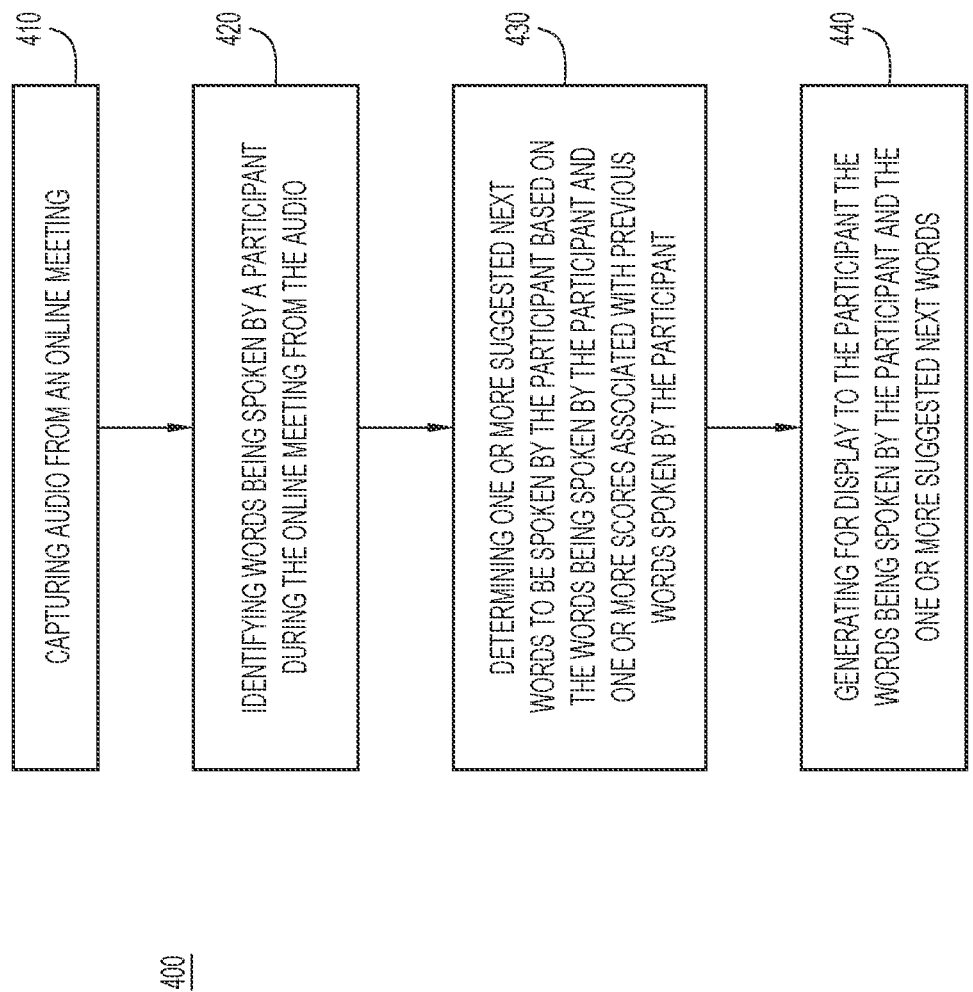
FIG. 4 is a flow diagram illustrating a method of providing autocomplete suggestions for speakers, according to an example embodiment.

Referring to FIG. 4, FIG. 4 illustrates a method 400 of generating and displaying one or more suggested next words. Method 400 may be performed by meeting server(s) 110 in combination with endpoint devices 120-1 to 120-N (e.g., NLP module 122) and/or additional devices.

At 410, audio is captured from an online meeting. For example, a participant may be speaking during an online meeting and a microphone may capture the audio of the participant speaking. At 420, words being spoken by the participant during the online meeting may be identified based on the audio. For example, NLP module 122 may determine the words that are being spoken by the participant. In one embodiment, NLP module 122 may determine the words when a CC option and an SaIS option have been selected by the participant.

At 430, one or more suggested next words or phrases to be spoken by the participant may be determined based on the words being spoken by the participant and one or more scores associated with previous words spoken by the participant. For example, NLP module 122 may determine possible continuation words or phrases based on the words previously spoken by the participant, words stored in the user profile 124, and scores associated with the words stored in the user profile. In some embodiments, NLP module 122 may determine the one or more suggested next words or phrases based on other factors, such as user preferences, words/phrases associated with a customer or enterprise, popular idioms or expressions, information associated with the online meeting, or other factors.

At 440, the words being spoken by the participant and the one or more suggested next words or phrases may be generated for display to the participant. For example, NLP module 122 may generate the one or more suggested next words or phrases and the words being spoken by the participant and the one or more suggested next words or phrases may be displayed on a display associated with the participant. In one embodiment, each suggested next word may be associated with a probability score and the one or more next words or phrases may be displayed based on the probability scores. For example, the suggested next word or phrase with a highest probability score may be displayed first. As another example, the one or more suggested next words or phrases may be displayed in different colors based on the probability scores. In some embodiments, the suggested next words or phrases with a probability score above a configurable threshold may be displayed.

Figure 5:
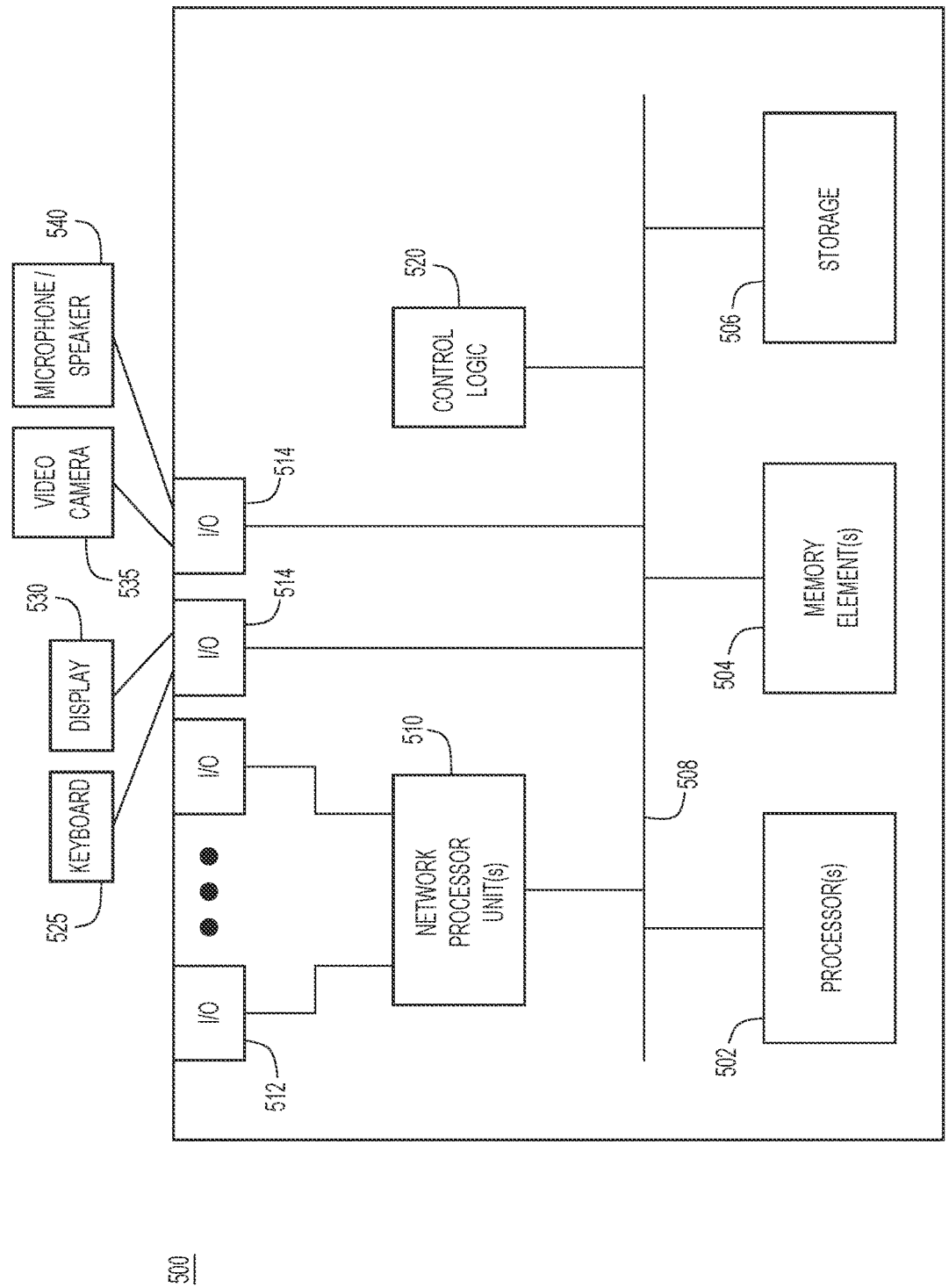
FIG. 5 is a hardware block diagram of a device that may be configured to perform the endpoint device-based operations involved in providing autocomplete suggestions for speakers, according to an example embodiment.

Referring to FIG. 5, FIG. 5 illustrates a hardware block diagram of a computing/computer device 500 that may perform functions of an endpoint device or an end device associated with operations discussed herein in connection with the techniques depicted in FIGS. 1-4. In various embodiments, a computing device, such as computing device 500 or any combination of computing devices 500, may be configured as any devices as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard 525, keypad, a touch screen, and/or any other suitable input and/or output device now known or hereafter developed. This may be the case, in particular, when the computer device 500 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 530 shown in FIG. 5, particularly when the computer device 500 serves as a user device as described herein. Display 530 may have touch-screen display capabilities. Additional external devices may include a video camera 535 and microphone/speaker combination 540. While FIG. 5 shows the display 530, video camera 535 and microphone/speaker combination 540 as being coupled via one of the I/O interfaces 514, it is to be understood that these components may instead be coupled to the bus 508.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 6:
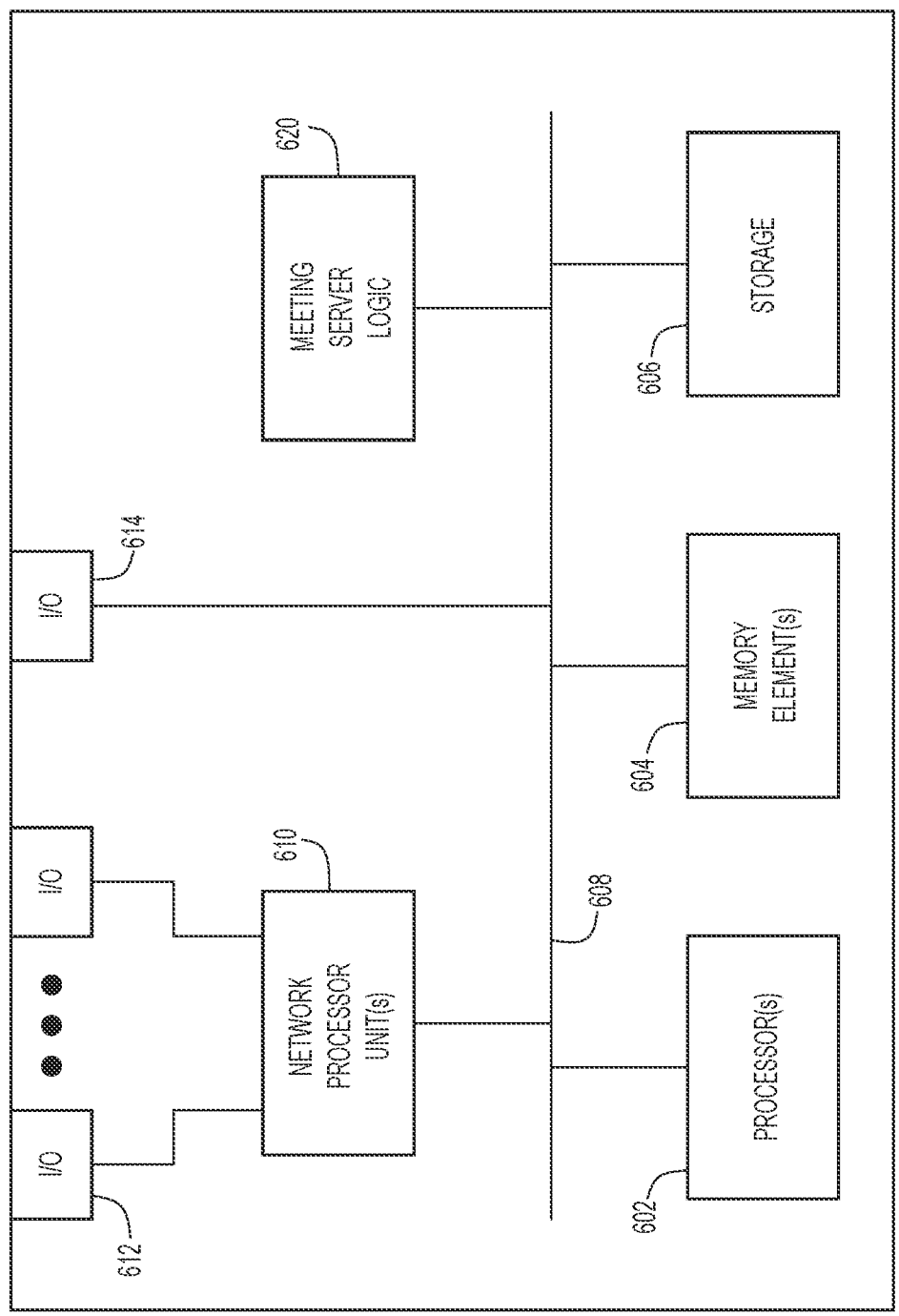
FIG. 6 is a hardware diagram of a computer device that may be configured to perform the meeting server operations involved in providing autocomplete suggestions for speakers, according to an example embodiment.

FIG. 6 illustrates a block diagram of a computing device 600 that may perform the functions of the meeting server(s) 110 described herein. The computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and meeting server logic 620. In various embodiments, instructions associated with the meeting server logic 620 is configured to perform the meeting server operations described herein, including those depicted by the flow chart for method 400 shown in FIG. 4.

In one form, a computer-implemented method is provided including capturing audio from an online meeting; identifying words being spoken by a participant during the online meeting from the audio; determining one or more suggested next words or phrases to be spoken by the participant based on the words being spoken by the participant and one or more scores associated with previous words spoken by the participant; and generating for display to the participant the words being spoken by the participant and the one or more suggested next words or phrases.

In one example, determining the one or more suggested next words or phrases to be spoken includes: dividing the words being spoken by the participant into tokens; analyzing the tokens to predict next tokens; and determining the one or more suggested next words or phrases based on the next tokens. In another example, generating for display the one or more suggested next words or phrases includes: determining a probability score for each predicted next word or phrase of the one or more suggested next words or phrases; and generating for display a suggested next word or phrase with a highest probability score first. In another example, the method further comprises generating for display the one or more suggested next words or phrases in different colors based on the probability score for each suggested next word or phrase. In another example, the previous words and the one or more scores associated with the previous words are stored in a profile associated with the participant.

In another example, the method further comprises identifying a next word or phrase spoken by the participant; updating a score associated with the next word or phrase when the next word or phrase is a suggested next word or phrase of the one or more suggested next words or phrases; and storing an indication of the next word or phrase and the score associated with the next word or phrase in the profile associated with the participant. In another example, determining the one or more suggested next words or phrases includes: identifying information from content associated with the online meeting; and determining the one or more suggested next words or phrases based on the information. In another example, determining the one or more suggested next words or phrases includes: identifying an enterprise or organization associated with the participant or the online meeting; identifying words spoken by participants associated with the enterprise or organization; and determining the one or more suggested next words or phrases based on the words spoken by the participants associated with the enterprise or organization.

In another form, an apparatus is provided including: a memory; a network interface configured to enable network communication; and a processor, wherein the processor is configured to perform operations including: capturing audio from an online meeting; identifying words being spoken by a participant during the online meeting from the audio; determining one or more suggested next words or phrases to be spoken by the participant based on the words being spoken by the participant and one or more scores associated with previous words spoken by the participant; and generating for display to the participant the words being spoken by the participant and the one or more suggested next words or phrases.

In yet another form, one or more non-transitory computer readable storage media encoded with instructions are provided that, when executed by a processor, cause the processor to execute a method including: capturing audio from an online meeting; identifying words being spoken by a participant during the online meeting from the audio; determining one or more suggested next words or phrases to be spoken by the participant based on the words being spoken by the participant and one or more scores associated with previous words spoken by the participant; and generating for display to the participant the words being spoken by the participant and the one or more suggested next words or phrases.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein.

Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   capturing audio from an online meeting;
   while the online meeting is occurring, identifying words being spoken by a participant during the online meeting from the audio;
   determining one or more suggested next words or phrases to be spoken by the participant based on the words being spoken by the participant and one or more scores associated with previous words spoken by the participant, wherein the previous words and the one or more scores associated with the previous words are stored in a profile associated with the participant;
   generating, for display on a user device being used by the participant to participate in the online meeting, the words being spoken by the participant and the one or more suggested next words or phrases;
   identifying a next word or phrase spoken by the participant;
   updating a score associated with the next word or phrase when the next word or phrase is a suggested next word or phrase of the one or more suggested next words or phrases; and
   storing an indication of the next word or phrase and the score associated with the next word or phrase in the profile associated with the participant.

2. The computer-implemented method of claim 1, wherein determining the one or more suggested next words or phrases to be spoken comprises:

dividing the words being spoken by the participant into tokens;
analyzing the tokens to predict next tokens; and
determining the one or more suggested next words or phrases based on the next tokens.

3. The computer-implemented method of claim 1, wherein generating for display the one or more suggested next words or phrases comprises:
determining a probability score for each predicted next word or phrase of the one or more suggested next words or phrases; and
generating for display a suggested next word or phrase with a highest probability score first.

4. The computer-implemented method of claim 3, further comprising:
generating for display the one or more suggested next words or phrases in different colors based on the probability score for each suggested next word or phrase.

5. The computer-implemented method of claim 1, wherein determining the one or more suggested next words or phrases comprises:
identifying information from content associated with the online meeting; and
determining the one or more suggested next words or phrases based on the information.

6. The computer-implemented method of claim 1, wherein determining the one or more suggested next words or phrases comprises:
identifying an enterprise or organization associated with the participant or the online meeting;
identifying words spoken by participants associated with the enterprise or organization; and
determining the one or more suggested next words or phrases based on the words spoken by the participants associated with the enterprise or organization.

7. The computer-implemented method of claim 1, further comprising:
assigning a new score to the next word or phrase when the next word or phrase is not a suggested next word or phrase of the one or more suggested next words or phrases.

8. The computer-implemented method of claim 1, wherein generating for display the one or more suggested next words or phrases comprises:
determining a probability score for each predicted next word or phrase of the one or more suggested next words or phrases; and
generating for display the one or more suggested next words or phrases with a probability score above a threshold score.

9. An apparatus comprising:
a memory;
a network interface configured to enable network communication; and
a processor, wherein the processor is configured to perform operations comprising:
capturing audio from an online meeting;
while the online meeting is occurring, identifying words being spoken by a participant during the online meeting from the audio;
determining one or more suggested next words or phrases to be spoken by the participant based on the words being spoken by the participant and one or more scores associated with previous words spoken by the participant, wherein the previous words and the one or more scores associated with the previous words are stored in a profile associated with the participant;
generating for display on a user device being used by the participant to participate in the online meeting the words being spoken by the participant and the one or more suggested next words or phrases;
identifying a next word or phrase spoken by the participant;
updating a score associated with the next word or phrase when the next word or phrase is a suggested next word or phrase of the one or more suggested next words or phrases; and
storing an indication of the next word or phrase and the score associated with the next word or phrase in the profile associated with the participant.

10. The apparatus of claim 9, wherein, wherein determining the one or more suggested next words or phrases to be spoken, the processor is configured to perform operations comprising:
dividing the words being spoken by the participant into tokens;
analyzing the tokens to predict next tokens; and
determining the one or more suggested next words or phrases based on the next tokens.

11. The apparatus of claim 9, wherein, when generating for display the one or more suggested next words or phrases, the processor is further configured to perform operations comprising:
determining a probability score for each predicted next word or phrase of the one or more suggested next words or phrases; and
generating for display a suggested next word or phrase with a highest probability score first.

12. The apparatus of claim 11, wherein the processor is further configured to perform operations comprising:
generating for display the one or more suggested next words or phrases in different colors based on the probability score for each suggested next word or phrase.

13. The apparatus of claim 9, wherein, when determining the one or more suggested next words or phrases, the processor is further configured to perform operations comprising:
identifying information from content associated with the online meeting; and
determining the one or more suggested next words or phrases based on the information.

14. The apparatus of claim 9, wherein, when determining the one or more suggested next words or phrases, the processor is further configured to perform operations comprising:
identifying an enterprise or organization associated with the participant or the online meeting;
identifying words spoken by participants associated with the enterprise or organization; and
determining the one or more suggested next words or phrases based on the words spoken by the participants associated with the enterprise or organization.

15. The apparatus of claim 9, wherein the processor is further configured to perform operations comprising:
assigning a new score to the next word or phrase when the next word or phrase is not a suggested next word or phrase of the one or more suggested next words or phrases.

16. The apparatus of claim 9, wherein, when generating for display the one or more suggested next words or phrases, the processor is further configured to perform operations comprising:
- determining a probability score for each predicted next word or phrase of the one or more suggested next words or phrases; and
- generating for display the one or more suggested next words or phrases with a probability score above a threshold score.

17. One or more non-transitory computer readable storage media encoded with instructions that, when executed by a processor, cause the processor to execute a method comprising:
- capturing audio from an online meeting;
- while the online meeting is occurring, identifying words being spoken by a participant during the online meeting from the audio;
- determining one or more suggested next words or phrases to be spoken by the participant based on the words being spoken by the participant and one or more scores associated with previous words spoken by the participant, wherein the previous words and the one or more scores associated with the previous words are stored in a profile associated with the participant;
- generating for display on a user device being used by the participant to participate in the online meeting the words being spoken by the participant and the one or more suggested next words or phrases;
- identifying a next word or phrase spoken by the participant;
- updating a score associated with the next word or phrase when the next word or phrase is a suggested next word or phrase of the one or more suggested next words or phrases; and
- storing an indication of the next word or phrase and the score associated with the next word or phrase in the profile associated with the participant.

18. The one or more non-transitory computer readable storage media of claim 17, wherein determining the one or more suggested next words or phrases to be spoken comprises:
- dividing the words being spoken by the participant into tokens;
- analyzing the tokens to predict next tokens; and
- determining the one or more suggested next words or phrases based on the next tokens.

19. The one or more non-transitory computer readable storage media of claim 17, wherein generating for display the one or more suggested next words or phrases comprises:
- determining a probability score for each predicted next word or phrase of the one or more suggested next words or phrases; and
- generating for display a suggested next word or phrase with a highest probability score first.

20. The one or more non-transitory computer readable storage media of claim 17, wherein generating for display the one or more suggested next words or phrases comprises:
- determining a probability score for each predicted next word or phrase of the one or more suggested next words or phrases; and
- generating for display the one or more suggested next words or phrases with a probability score above a threshold score.

* * * * *